United States Patent

[11] 3,598,958

| [72] | Inventors | Ernest A. Davey<br>Lynn;<br>Wallace T. MacDonald, Tewksbury, both of, Mass. |
|---|---|---|
| [21] | Appl. No. | 880,186 |
| [22] | Filed | Nov. 26, 1969 |
| [45] | Patented | Aug. 10, 1971 |
| [73] | Assignee | Sylvania Electric Products Inc. |

[54] RESISTANCE HEATED EVAPORATION BOAT
6 Claims, 1 Drawing Fig.

[52] U.S. Cl. ................................... 219/275, 219/553
[51] Int. Cl. .................................... F22b 1/28
[50] Field of Search ........................... 219/271, 275, 538, 548, 552, 553; 13/25; 117/107; 108/48, 49, 49.1

[56] References Cited
UNITED STATES PATENTS

| 3,231,846 | 1/1966 | Radke | 219/271 X |
| 3,271,561 | 9/1966 | Fiedler et al. | 219/271 |
| 3,450,097 | 6/1969 | Firestone et al. | 219/271 X |

FOREIGN PATENTS

| 869,825 | 3/1953 | Germany | 219/271 |

Primary Examiner—J. V. Truhe
Assistant Examiner—C. L. Albritton
Attorneys—Norman J. O'Malley and James Theodosopoulos ABSTRACT: An electrically heated boat for the evaporation of powdered material comprises a thin folded sheet of tantalum arranged in the form of a container that holds a large volume of powder in relation to the size of the sheet. The ends of the boat are flat to permit clamping thereof to the electrical posts of a vacuum evaporation apparatus. Excessive operating temperature variations throughout the boat are avoided by fabricating the boat so as to maintain substantially uniform wall thickness therethroughout.

PATENTED AUG 10 1971
3,598,958
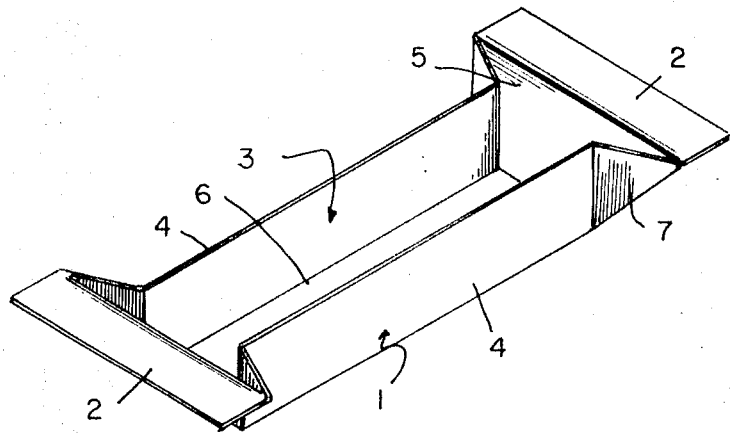
ERNEST A. DAVEY
WALLACE T. MacDONALD
INVENTORS
BY James Theodoropoulos
AGENT

RESISTANCE HEATED EVAPORATION BOAT

BACKGROUND OF THE INVENTION

1. Field of the Invention

This invention relates to the field of resistance-heated sheet metal evaporation boats for the evaporation of powdered materials.

2. Description Of The Prior Art

In the past resistance-heated evaporation boats have commonly been made of graphite bars or other electrically conductive refractory powders pressed into a dense monolith. Such boats are relatively massive in relation to the volume of material they could contain. In addition, they generally required large amounts of electric power to heat and maintain them at the evaporation temperature of the contained material. The resultant excessive heat could be detrimental to the substrate on which the evaporated material was to be deposited. Also, the high power requirements of such boats resulted in the need of large electric power supplies.

Other commonly used evaporation sources are wound coils of refractory metal wire, such as tungsten and molybdenum. Such evaporation sources are suitable where the material to be evaporated is in the form of a slug or solid mass and can be retained within the relatively open container defined by the coil body. However, such sources are not suitable for the evaporation of powdered materials.

In the field of dichroic coated lamp reflectors, an example of which is shown in U.S. Pat. No. 3,162,785 issued on Dec. 22, 1964 to R. F. Scoledge et al., alternate layers of two different materials are deposited on a glass reflector in order to form a dichroic coating. Generally these materials are deposited by the evaporation thereof from a resistance-heated evaporation boat and quite often the materials are placed in the boat in powder form. For example, the magnesium fluoride mentioned therein is usually such a material.

One type of boat often used in the evaporation of such powdered materials comprises a flat sheet of tungsten the center of which has been drawn into a somewhat spherically shaped cavity. The depth of the cavity is usually small since tungsten is a brittle metal that is not readily cold workable. Also, the tungsten usually has to be relatively thick, say about 0.050 inch, in order to prevent sagging thereof during operation. Although the cost of fabricating such a boat is low, the small volume of material that it can contain unduly limits the number of articles that can be coated at one time. Also, the sheet metal thickness needed to prevent sagging adds undesirable mass to the boat which, in turn, requires more electric power for operation than would be necessary if thinner metal could be used. In addition, the drawn portion of the boat is thinner than the undrawn portions thereof, resulting in nonuniformity in wall thickness and electrical resistivity, which can cause undesirable temperature variations therein.

SUMMARY OF THE INVENTION

A resistance-heated evaporation boat in accordance with this invention is fabricated from a thin rectangular sheet of tantalum in such a manner as to form a container that has a large volume in relation to the area of the sheet. In addition, the structure of the boat is such that the worked areas of the metal sheet are low stress areas that can withstand high operating temperatures without excessive distorting or buckling. Also, the worked areas should not substantially change the thickness of the metal sheet, as could occur in metal drawing, pressing or welding operations, since a nonuniform thickness could result in an undesirable nonuniform current flow through the boat.

A boat in accordance with this invention also has ends suitable for clamping in the usual electrical posts of vacuum evaporation apparatus, the ends having relatively large surface area in order to provide low resistance contact with the posts.

During operation, the boat is heated to a high enough temperature to evaporate in vacuo the material contained therein, such temperatures usually being between about 1,200° and 2,000° C. The one-piece folded construction of the instant boat, especially the construction of the vertical sides thereof, permits such high-temperature operation without substantial sagging of the center of the boat. Also, the folded construction provides a boat that is more economical to fabricate than many other presently available boats that have a large cavity.

BRIEF DESCRIPTION OF THE DRAWING

The single FIGURE is a perspective drawing of a one-piece folded boat in accordance with this invention.

Description of the Preferred Embodiment

As shown in the drawing boat 1 is folded from a single rectangular sheet of refractory metal to provide full width flat ends 2 and a large cavity 3. Cavity 3 is defined by two long vertical sides 4 and two tapered slanted sides 5, sides 5 being in register between ends 2 and bottom 6 of cavity 3. Complete enclosure of cavity 3 results from four substantially triangular sections 7 being in register between sides 4 and sides 5.

In one example, boat 1 was made from a flat 10-mil sheet of tantalum, 4½-inches long by 2⅛-inches wide. First, the sheet was folded upward 72° at lines 1¼ inches from, and parallel to, the ends of the sheet. These folds defined the initial stage of slanted sides 5. Then the ends of the sheet were folded back parallel to the main body of the sheet in order to form flat ends 2, ends 2 having dimensions of 2⅛ by ½ inch. Finally the sides of the sheet between the two initial slanted folds were folded up 90° at lines 11/16 inch in from the edge to form vertical sides 4. This last folding operation also resulted in the tapering of sides 5 and the formation of triangular sections 7, their formation being relatively stress-free as a result of the space between sides 4 and sides 5 provided by the 72° slant of sides 5.

The volume of cavity 3 was 1.15 cubic inches, which is relatively large in relation to either the area of the sheet metal, 9.56 square inches, or the weight of the boat, 25 grams.

In operation, cavity 3 was completely filled with about 40 grams of powdered magnesium fluoride and the boat was placed in a vacuum evaporation apparatus containing 455 2¼-inch glass reflectors to be dichroic coated. About 500 amperes of electric current at about 6 volts was required to melt the powder and raise it to its evaporation temperature of about $5 \times 10^{-5}$ Torr. The magnesium fluoride melted at about 1,400° C., the liquid occupying only about three-fourths of the volume of the powder.

The dichroic coating consisted of a total of 20 alternating layers of magnesium fluoride and zinc sulfide, the latter being evaporated from a separate source.

At the conclusion of the dichroic coating cycle, about 5 to 10 grams of magnesium fluoride remained in the boat; its condition was generally satisfactory for refilling and reuse as a magnesium fluoride evaporation boat.

Boat 1 is preferably made of tantalum since it is sufficiently refractory to withstand high evaporating temperatures and sufficiently cold workable to be folded into the desired shape without the need of heat or special tools. Other refractory metals, such as tungsten or molybdenum, are generally too brittle for this process.

Preferably, also, the height of each vertical side 4 should be about equal to the width of bottom 6, that is to say, vertical sides 4 should be folded at lines that are located at about one-third the width of the rectangular sheet in from each long edge. Such a relationship provides an adequately sag-resistant boat that can contain a sufficient volume of material for normal evaporation operations, where successive coatings are deposited on a large number of articles in a vacuum chamber without breaking of the vacuum. Such a relationship also provides an adequately wide opening in cavity 3 to permit mounting of said large number of articles in line-of-sight with the powdered material within the cavity. Normally, the evaporated material travels in a straight line and can deposit only on articles that are in line-of-sight with the powdered material within cavity 3.

For purposes of this invention the ratio of the height of vertical side 4 to the width of bottom 6 can vary between about 2:1 and 1:2 and still provide adequate sag resistance with a wide enough cavity opening for line-of-sight deposition on a large number of articles, such as reflectors.

We claim:

1. A resistance-heating longitudinal boat for the high temperature evaporation of powdered materials comprising a unitary folded sheet of tantalum having a cavity and flat ends, said flat ends adapted to be clamped to electrical posts of evaporation apparatus, said flat ends comprising only a single thickness of said sheet.

2. The boat of claim 1 wherein said cavity is defined by a flat bottom, two opposing vertical sides and two opposing tapered slanted sides.

3. The boat of claim 2 wherein said vertical sides are joined to said slanted sides by substantially triangular sections, said triangular sections being inherent parts of said unitary folded sheet of tantalum.

4. The boat of claim 2 wherein said flat ends are substantially parallel to said bottom.

5. The boat of claim 2 wherein the ratio of the height of each of said vertical sides to the width of said bottom is between about 2:1 and 1:2.

6. The boat of claim 5 wherein said ratio is about unity.